Sept. 27, 1938.  W. H. PAYNE  2,131,068
DRAFT CONNECTION FOR TRAILERS
Filed Oct. 5, 1936
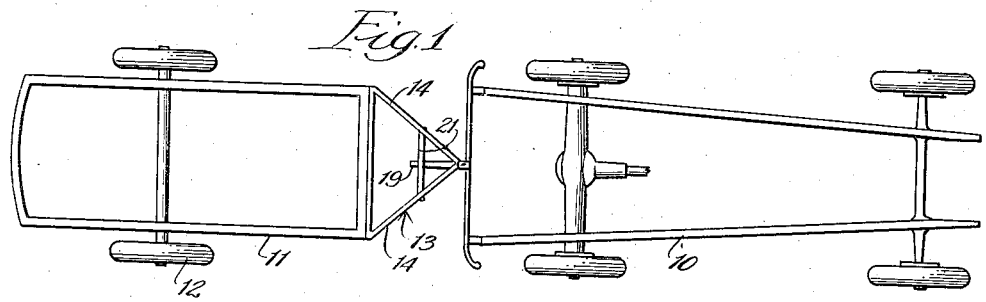
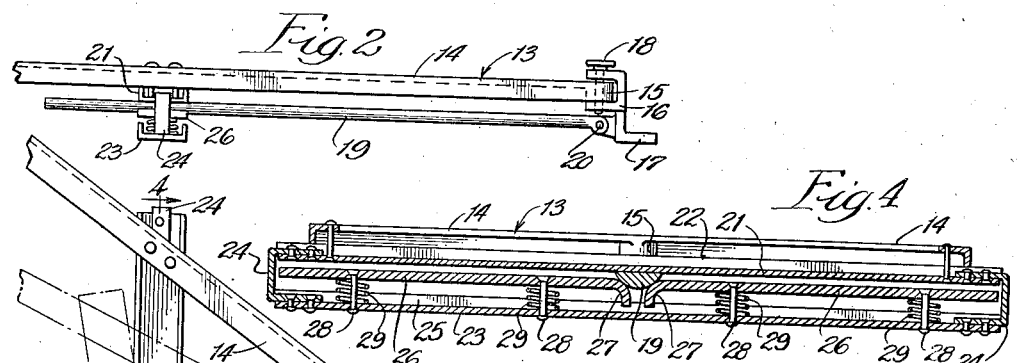
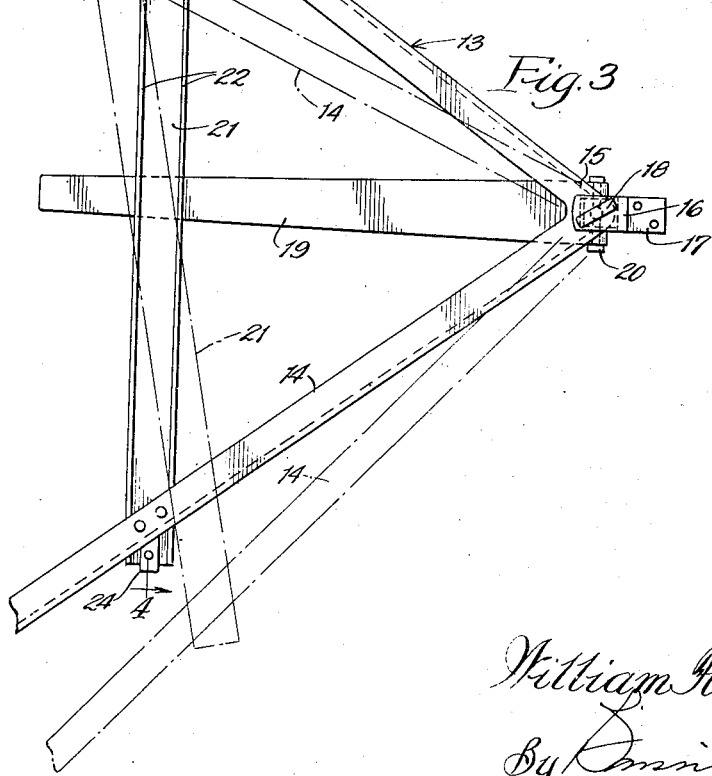
Inventor:
William Harvey Payne,
By [signature]
Attorneys.

Patented Sept. 27, 1938

2,131,068

UNITED STATES PATENT OFFICE 2,131,068

DRAFT CONNECTION FOR TRAILERS

William Harvey Payne, La Grange, Ill.

Application October 5, 1936, Serial No. 103,999

9 Claims. (Cl. 280—33.44)

In the use of trailers, especially when traveling at high speed, a tendency sometimes develops for the trailer to swing or sway from side to side, and this effect, unless corrected, tends to become accentuated to an extent which may result in an overturning of the trailer, with a possible wrecking of the automobile.

As is well known, trailers of the usual type are mounted upon a single pair of wheels which are ordinarily located to the rear of the center of gravity and at a very considerable distance from the point of draft attachment, and in these circumstances there is a lack of adequate control against swinging or swaying movement unless provision is made to retard and dampen the swaying tendency before it develops to an excessive degree. The present invention is designed to meet these conditions and to afford adequate means for preventing swinging or swaying, without, however, interfering with the proper turning of the trailer to follow the course of the automobile.

Further objects and details will appear from the description of the invention in conjunction with the accompanying drawing, wherein,—

Figure 1 is a plan view of the frame of an automobile and trailer embodying the draft connections of the present invention;

Fig. 2 is a side elevation of the same;

Fig. 3 is an enlarged plan view showing in dotted lines the position occupied by the draft connections in turning; and Fig. 4 is a sectional elevation taken on line 4—4 of Fig. 3.

The draft connection of the present invention is applied to any convenient portion of the automobile chassis 10 for the connection of a trailer mobile chassis 10 for the connection of a trailer 11 mounted upon a single pair of wheels 12, located somewhat to the rear of the center of the trailer frame, which is provided with a draft yoke 13 which comprises forwardly converging bars 14 which meet in a head 15. The head, as shown, is held between the upper and lower arms of a bifurcated bracket 16 carried at the upper end of an arm 17 which is suitably connected to some convenient portion of the frame of the automobile. A pintle 18 affords a pivotal mounting for the yoke, which in the absence of any restraining means would be free to swing from side to side on its pivotal mounting.

In order to prevent excessive swaying or swinging of the draft yoke and the trailer united therewith, the following devices are provided: The bracket arm 17 has rearwardly extending therefrom a tongue bar 19 which is preferably flattened on its upper face and rounded on its under face, and is of slightly tapering construction from front to rear. The front or free end of the bar is mounted upon a horizontal pintle 20 carried by the bracket arm 17, so that the tongue bar is free to swing vertically but is prevented from longitudinal movement with respect to the frame of the automobile.

The arms of the draft yoke 13 are connected at an intermediate point by an upper cross bar 21 of channel formation in cross section, with the side flanges 22 presented upwardly. This affords a flat under face for contact with the flat upper face of the tongue bar 19. The upper cross bar 21 cooperates with a lower cross bar 23 which extends parallel thereto, the bars being connected at their ends by means of brackets 24 which hold the two bars rigidly in spaced relation with one another. The lower bar 23 is likewise of channel formation having the flanges 25 presented upwardly.

Between the upper and lower cross bars are located a pair of friction shoe plates 26 which are downturned at their inner ends 27 to afford an intermediate groove or notch for receiving the grounded under surface of the tongue bar 19 when the same stands in its straightaway or medial position. The friction shoes 26 are guided by bolts 28 which are slidably mounted through apertures to the lower plate 23 and are encircled by springs 29 which serve to normally force the friction shoes toward the upper cross bar 21 to the limit of movement afforded by the headed bolts 28. It is preferred to employ heavier springs for the outer bolts and lighter springs for the inner bolts, so that the outer ends of the friction shoes will afford greater resistance to depression than the inner ends thereof.

In operation, with the automobile and its trailer in the normal or aligned relation, the tongue bar will be socketed between the inner ends of the friction shoes, which will thus afford considerable impediment to any movement of the parts. This resistance, however, will not be sufficient to interfere with the turning or guiding of the automobile and its trailer, since a turning movement of the automobile will cause the tongue bar to ride out of the socket normally afforded for its retention, and to depress the inner end of one or the other of the friction shoes, which will thus permit lateral swinging or sliding of the tongue bar to the degree required in guiding or turning the vehicles. However, such swinging movements will be increasingly resisted as the swinging or turning movement increases, and this increase in resistance will be afforded not only by heavier tension of the outer springs but also by the increasingly effective length of the lever arm afforded by the tongue bar, which, as it swings laterally in relation to one or the other of the friction shoes, will contact the same at an increasing distance from the pivotal mounting of the tongue bar.

Although the above movements are necessarily permitted in the normal guiding or turning of the vehicles, the present invention serves to dampen and resist any tendency toward uncontrolled swinging or swaying which may develop during the normal straightaway travel of the vehicles. In such cases the automobile will be traveling in a straight line of advance and under the control of its four wheels, while the trailer, traveling on two wheels, may develop a swinging or swaying tendency. Under normal conditions such tendency will be resisted in the first instance by the socket afforded for the tongue bar between the downturned inner ends of the friction shoes, but if swaying begins to develop it will be increasingly resisted and damped by the progressively increasing friction afforded by the friction shoes and the increase in the effective length of the lever arm afforded by the tongue bar. The tendency will thus be to restore the tongue bar to its medial position and to prevent any excessive swaying which might result if the initial tendency in that direction were unimpeded or uncontrolled.

Of course, it will be understood that the yoke connection is rigid with the frame of the trailer, since this connection affords the vertical support for the forward end of the trailer, but the pivoting of the yoke bar affords sufficient freedom of vertical movement to prevent any binding or cramping of the connections which might interfere with the normal turning movements of the vehicle.

Although the invention has been described with considerable particularity as to detail, it is not the intention, unless otherwise indicated in the claims, to limit the invention to the specific mechanism shown.

I claim:

1. In a draft connection for trailers, in combination with an automobile frame and a trailer frame, a yoke member rigidly secured to and extending forwardly from the trailer frame, a tongue bar secured to and extending rearwardly from the automobile frame, and laterally elongated frictional elements carried by the yoke and frictionally engaging the tongue bar and adapted to permit lateral movement of the tongue bar with respect to said frictional elements and adapted to impart a progressively increasing friction in ratio to the extent of relative lateral movement of the tongue bar.

2. In a draft connection for trailers, in combination with an automobile frame and a trailer frame, a yoke member rigid with and extending forwardly from the trailer frame, a tongue bar secured to and extending rearwardly centrally from the automobile frame, transversely elongated spaced frictional elements connected with the yoke and relatively movable toward and away from one another and bearing upon the upper and lower sides of the tongue bar and adapted to permit lateral swinging of the tongue bar under frictional contact, and spring means for forcing the frictional elements toward one another to grip the tongue bar.

3. In a draft connection for trailers, in combination with an automobile frame and a trailer frame, a yoke member rigid with and extending forwardly from the trailer frame, a tongue bar secured to and extending rearwardly centrally from the automobile frame, and transversely elongated frictional elements connected with the yoke and bearing upon the upper and lower sides of the tongue bar and having frictional engagement therewith and adapted to permit lateral swinging of the tongue bar under frictional contact and adapted to apply gradually increasing friction as the parts are moved away from the center position.

4. In a draft connection for trailers, in combination with an automobile frame and a trailer frame, a yoke member rigidly secured to and extending forwardly from the trailer frame, a tongue bar secured to and extending rearwardly centrally from the automobile frame, and transversely elongated frictional elements connected with the yoke and bearing upon the upper and lower sides of the tongue bar and adapted to permit lateral swinging of the tongue bar under frictional contact, said frictional elements including a pair of spring pressed shoes adapted to bear against one of the faces of the tongue bar in conjunction with a frictional element adapted to bear against the opposite face of the tongue bar.

5. In a draft connection for trailers, in combination with an automobile frame and a trailer frame, a yoke member rigidly secured to and extending forwardly from the trailer frame, a tongue bar secured to and extending rearwardly from the automobile frame, and transversely elongated frictional elements connected with the yoke and bearing upon opposite sides of the tongue bar and adapted to permit lateral swinging of the tongue bar under frictional contact and adapted to apply progressively increasing friction in relation to the ratio of lateral movement, said frictional elements including a pair of spring pressed shoes adapted to bear against one of the faces of the tongue bar in conjunction with a frictional element adapted to bear against the opposite face of the tongue bar.

6. In a draft connection for trailers, in combination with an automobile frame and a trailer frame, a yoke member rigidly secured to and extending forwardly from the trailer frame, a tongue bar secured to and extending rearwardly from the automobile frame, and transversely elongated frictional elements connected with the yoke and bearing upon opposite sides of the tongue bar and adapted to permit lateral swinging of the tongue bar under frictional contact, said frictional elements including a pair of spring pressed shoes adapted to bear against one of the faces of the tongue bar in conjunction with a frictional element adapted to bear against the opposite face of the tongue bar, the spring pressed shoes at their inner ends being rounded to afford a space for the normal seating of the tongue bar between the shoes.

7. In a draft connection for trailers, in combination with an automobile frame and a trailer frame, a yoke member rigidly secured to and extending forwardly from the trailer frame, a tongue bar secured to and extending rearwardly from the automobile frame, and transversely elongated frictional elements connected with the yoke and bearing upon opposite sides of the tongue bar and adapted to permit lateral swinging of the tongue bar under frictional contact and adapted to apply progressively increasing friction in relation to the ratio of lateral movement, said frictional elements including a pair of spring pressed shoes adapted to bear against one of the faces of the tongue bar in conjunction with a frictional element adapted to bear against the opposite face of the tongue bar, the spring pressed shoes at their inner ends being rounded to afford a space for the normal seating of the tongue bar between the shoes.

8. In a draft connection for trailers, in combination with an automobile frame and a trailer frame, a draft yoke member extending forwardly from the trailer frame and rigidly connected thereto, means for pivoting the forward end of the yoke to the automobile frame, a tongue bar pivotally mounted on a horizontal pivot and rearwardly extending from the automobile frame, a cross bar rigidly secured to the yoke and bearing against the upper surface of the tongue bar, and spring pressed shoes associated with the cross bar and bearing upon the under surface of the tongue bar.

9. In a draft connection for trailers, in combination with an automobile frame and a trailer frame, a draft yoke member extending forwardly from the trailer frame and rigidly connected thereto, means for pivoting the forward end of the yoke to the automobile frame, a tongue bar pivotally mounted on a horizontal pivot and rearwardly extending from the automobile frame, a cross bar rigidly secured to the yoke and bearing against the upper surface of the tongue bar, and spring pressed shoes associated with the cross bar and bearing upon the under surface of the tongue bar, the spring compression at the outer ends of the shoes being greater than at the inner ends thereof to afford a progressively increasing friction in ratio to the extent of relative movement of the tongue bar to the friction elements.

WILLIAM HARVEY PAYNE.